United States Patent [19]
Huang

[11] Patent Number: 5,363,704
[45] Date of Patent: Nov. 15, 1994

[54] FLUIDIC OSCILLATOR AND A FLOW METER INCLUDING SUCH AN OSCILLATOR

[75] Inventor: Bao T. Huang, Antony, France

[73] Assignee: Schlumberger Industries, Montrouge, France

[21] Appl. No.: 913,498

[22] Filed: Jul. 14, 1992

[51] Int. Cl.⁵ .......................... G01F 1/20; F15C 1/22
[52] U.S. Cl. ................... 73/861.19; 137/826; 137/842
[58] Field of Search ........... 73/861.18, 861.19, 861.21; 137/811, 826, 833, 842

[56] References Cited

U.S. PATENT DOCUMENTS

| | | | |
|---|---|---|---|
| 4,244,230 | 1/1981 | Bauer | 73/861.19 |
| 4,854,176 | 8/1989 | Okabayashi | 73/861.19 |
| 4,976,155 | 12/1990 | Challandes | 137/833 X |

Primary Examiner—Herbert Goldstein
Attorney, Agent, or Firm—Sanford J. Asman

[57] ABSTRACT

A fluidic oscillator and a flow meter including such a fluidic oscillator comprising a fluid inlet suitable for forming a two-dimensional jet: an obstacle possessing a front portion in the form of a chamber facing the inlet on the path of the jet, said chamber including two walls that are symmetrical about a longitudinal plane of symmetry passing through said inlet, the walls meeting said plane; and means for increasing the pressure on each of the lateral flanks of the obstacle in the vicinity of the front portion in alternation and in a relationship with the oscillation of the jet between the walls of the chamber.

19 Claims, 7 Drawing Sheets

FLUIDIC OSCILLATOR AND A FLOW METER INCLUDING SUCH AN OSCILLATOR

The present invention relates to a fluidic oscillator enabling the flow rate of a fluid, a liquid or a gas, to be measured.

BACKGROUND OF THE INVENTION

Fluidic oscillators are of considerable interest for metering the volumes of fluids such as water and gas delivered to users. Most flow meters presently in existence use mechanical moving parts. This applies in particular to flow meters using a turbine or a membrane. In comparison, fluidic oscillators do not have any moving parts liable to wear over time, and consequently such oscillators do not need recalibrating.

Such oscillators can be small in size and very simple in design. They are therefore very reliable. In addition they deliver a frequency signal which is easily converted into a digital signal. This characteristic is particularly advantageous when meters are read remotely.

Most effort in developing such flow meters has been directed to vortex effect flow meters and to Coanda effect flow meters.

The principle on which vortex effect flow meters operate is based on the well-known fact that the presence of an obstacle in a duct along which a fluid is flowing gives rise to eddies that escape periodically. Measurement is based on detecting the frequency at which eddies detach, which frequency is proportional to the flow speed for an obstacle of given geometry.

The eddy frequency is measured in various ways which make it possible to derive the mean speed of the flow and thus the flow rate. Vortex effect flow meters are generally very sensitive to noise and to fluid conditions upstream. In practice, a flow rectifier is used to make the speed profile uniform. A flow meter of this type is described, for example, in U.S. Pat. No. 3,589,185.

The Coanda effect as used in Coanda effect flow meters consists in the natural tendency of a fluid jet to follow the contours of a wall when the jet is discharged close to the wall, even if the outline of the wall departs from the discharge axis of the jet. A fluidic oscillator of this type includes a chamber into which the fluid jet discharges through a converging nozzle. Two side walls are placed in the chamber symmetrically about the discharge axis of the jet. The jet leaving the inlet to the oscillator attaches itself spontaneously to one of the side walls by the Coanda effect. A portion of the flow is then bled off via a lateral channel of the wall to which the jet attaches itself, thereby having the effect of detaching the jet from said wall and attaching it to the opposite wall. The phenomenon then takes place again, thus giving rise to permanent oscillation in the incoming flow. Unfortunately, in this type of apparatus, the range over which flow can be measured is relatively limited and the nonlinearity of the calibration curve is quite large. Furthermore, this type of apparatus may stop oscillating under certain conditions relating to external disturbances, and this gives rise to a loss of signal. To increase the range in which measurement is possible, Okadayashi et al. have proposed, in U.S. Pat. No. 4,610,162, combining two fluidic oscillators, one operating at low flow rates and the other at high flow rates.

Because of the drawbacks encountered with vortex effect and with Coanda effect flow meters, attempts have been made to develop other types of fluidic oscillator which operate using principles that are fundamentally different. Applications thereof are found in the flow meters described in the following U.S. Pat. Nos.: 4,184,636, 4,244,230 and 4,843,889.

For example, U.S. Pat. No. 4,244,230 describes a fluidic oscillator flow meter placed in a duct on the path of the fluid, and extracting a portion of the fluid. The oscillator has two members disposed side by side and having facing walls that form a nozzle. An obstacle has a frontal oscillator chamber placed facing the nozzle. The chamber has a common inlet and outlet. The jet leaving the nozzle penetrates into the chamber and strikes the far wall of the chamber.

The jet is put into transverse oscillation inside the chamber by the formation of two eddies on either side of the jet. The eddies alternate between being strong and weak, in phase opposition. The jet leaves via the common outlet and is directed into the main flow.

Pressure sensors enable the oscillation frequency of the jet in the chamber to be measured, which frequency is proportional to the flow rate.

The performance of flow meters of that type is generally better than the performance obtained using conventional fluidic flow meters. Unfortunately, said performance is still not satisfactory, in particular with respect to sensitivity and measurement range.

An object of the present invention is to remedy the above drawbacks. The invention provides a fluidic oscillator and a flow meter including such an oscillator and having performance that is better than that of prior art flow meters.

SUMMARY OF THE INVENTION

More precisely, the invention provides a fluidic oscillator enabling jet oscillation to be maintained even at low flow rates. The oscillator comprises:
  a fluid inlet suitable for forming a two-dimensional jet;
  an obstacle possessing a front portion in the form of a chamber facing the inlet, and located on the path of the jet, said chamber including two walls that are symmetrical about a longitudinal plane of symmetry passing through said inlet, the walls meeting in said plane;
  the oscillator being characterized in that it comprises means for alternately increasing the pressure on each of the side flanks of the obstacle in the vicinity of its front portion in relation with oscillation of the jet between the walls of the chamber.

Advantageously, the walls of the chamber are inclined substantially to form a V-shape whose two branches flare.

In a particular embodiment, the oscillator includes an enclosure opening out firstly to the fluid inlet and secondly to a fluid outlet, the obstacle being disposed within said enclosure, said enclosure having walls cooperating with the outside walls of the obstacle to form flow passages for the fluid.

Advantageously, the means for increasing pressure comprise two main passages disposed symmetrically through the walls of the chamber, each of said passages being inclined relative to the longitudinal plane and having an inlet inside the chamber and an outlet on one of the lateral flanks of the obstacle.

According to an advantageous feature of the invention, the said passages are slots.

Said passages may be circular or rectangular or square in section.

In a particular embodiment, the section of the passages decreases initially and then increases.

Advantageously, said passages pass through said chamber at or close to the stop point of the jet.

In a variant embodiment, the oscillator includes at least two additional fluid passages formed through said obstacle, said additional passages being downstream from the first passages and being symmetrically disposed relative to the longitudinal plane of symmetry.

In a particular embodiment, at least said main passages are bent.

The invention also provides a flow meter including such a fluidic oscillator, the fluid oscillating between the walls of the chamber at an oscillation frequency that is characteristic of the fluid flow rate, the meter also including means for measuring the oscillation frequency.

Said means for measuring the oscillation frequency comprise means for measuring variations in the flow speed of the fluid through the passages formed through the walls of the chamber.

BRIEF DESCRIPTION OF THE DRAWINGS

Embodiments of the invention are described by way of example with reference to the accompanying drawings, in which.

DETAILED DESCRIPTION

Figure 1B:
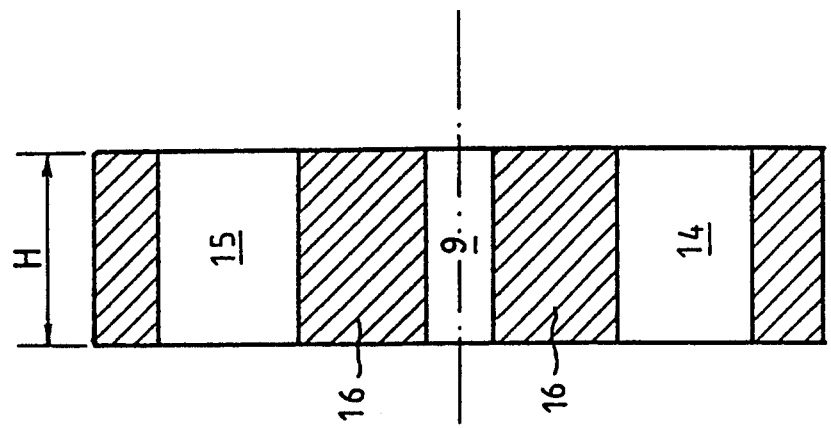
FIGS. 1A and 1B show an embodiment of a flow meter including a fluidic oscillator of the present invention, FIG. 1A showing the oscillator in longitudinal section and FIG. 1B being a cross-section on line AA of FIG. 1A.
Figure 1A:
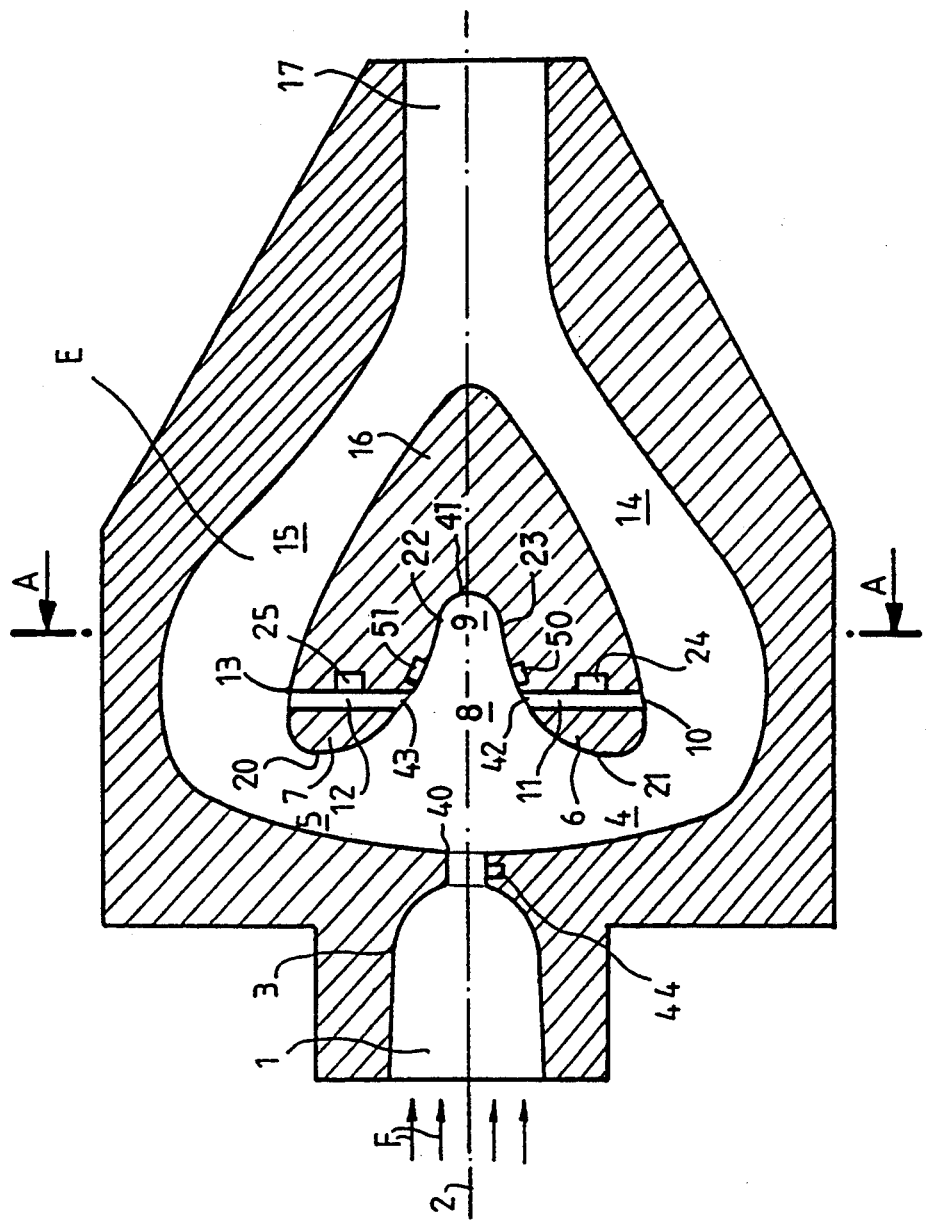

FIGS. 1A and 1B are a diagram of a flow meter including a fluidic oscillator of the invention and a section view of the oscillator. The fluid whose flow rate is to be measured may be a liquid or a gas and it is represented by arrows F.

As can be seen in FIGS. 1A and 1B, the oscillator has a longitudinal plane of symmetry 2.

The fluid penetrates into the oscillator via a chamber 1 in the form of a cube of side equal to the height of the jet followed by an inlet in the form of a rectangular-section convergent nozzle 3. The chamber 1 provides a transition between an axisymmetrical flow and the two-dimensional flow required in the oscillator. The use of a convergent nozzle 3 enables the flow speed of the fluid to be increased.

Means other than a convergent nozzle could be used for obtaining such a fluid jet, for example a duct of small diameter and of sufficient length.

The fluid inlet opens out into an enclosure E. An obstacle 16 formed with two lateral or side flanks that are symmetrically shaped about the longitudinal plane of symmetry 2 is placed inside the enclosure E. A convergent chamber 8 is formed in the side flanks of front portion of the obstacle 16 facing the outlet from the nozzle 3. In this way, the fluid jet delivered by the nozzle on penetrating into the convergent chamber 8 gives rise to two eddies that are symmetrical about the plane of symmetry 2.

The front portion of the obstacle 16 facing the nozzle 3 is v-shaped with the branches of the v-shape flaring outwardly (walls 20 and 21 in FIG. 1A). The inside of the v-shape is formed by two walls 22 and 23 that are inclined and symmetrical about the plane 2. These two walls 22 and 23 meet in the plane 2 to form a dead space 9. The walls 20 to 23 are convex in shape except for that portion of the walls 22 and 23 which is close to the plane of symmetry 2, with said portions of the walls 22 and 23 being concave in shape. Each of the walls of the obstacle 16 is pierced by a fluid passage 11 or 12. These passages are disposed symmetrically about the plane 2.

These passages are advantageously slots so as to form two islands 6 and 7 in the obstacle 16. The passages 11 and 12 may be channels and they may be circular or rectangular or square in section. In FIG. 1A, the section of the passages 11 and 12 is uniform.

Figure 2A:
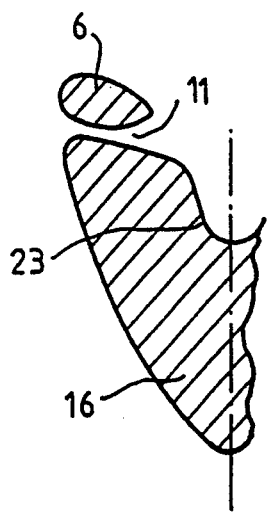
FIG. 2A is a fragmentary diagrammatic view of an obstacle provided with a passage forming a venturi in accordance with a particular embodiment of the invention.

Nevertheless, the section may decrease so as to accelerate the fluid flowing through said passages (the venturi effect) and may then increase so as to avoid additional head loss. FIG. 2A is a diagram providing a fragmentary view of the obstacle 16 when provided with a passage 11 that has a venturi shape.

The fluid may also flow through the oscillator via passages 5, 15, 4, and 14 that exist between the walls of the obstacle 16 and the walls of the enclosure E.

FIG. 1B is a cross-section through the fluidic oscillator as marked by arrows AA. It may be observed that the shape of the fluidic oscillator in cross-section perpendicular to the plane of symmetry 2 is rectangular. In this particular embodiment, the height H of the oscillator is about 7 times the width of the inlet nozzle to the oscillator.

Inside the slots 11 and 12, sensors 24 and 25 enable the flow speed of the fluid in the slots to be measured.

Figure 3:
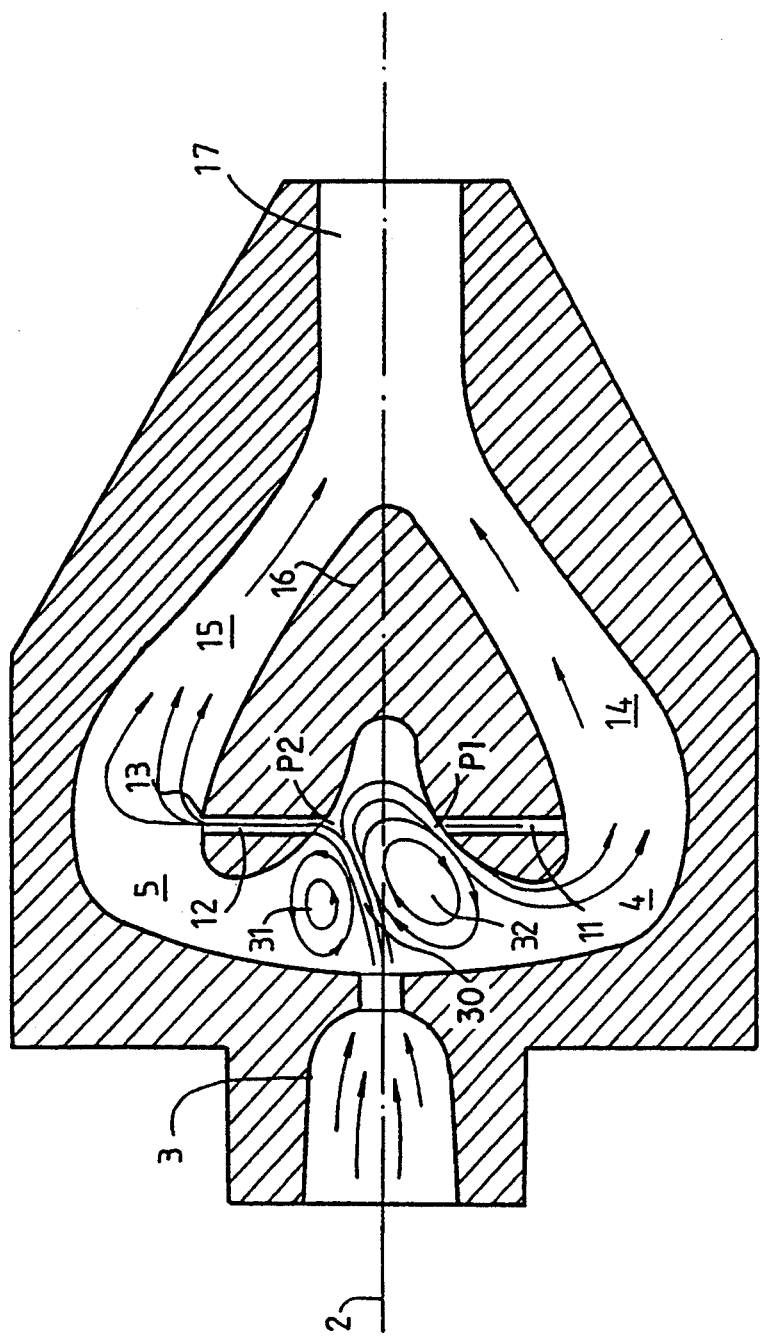
FIG. 3 shows the operating principle of the fluidic oscillator.

FIG. 3 shows how the fluidic oscillator of the present invention operates. The flow whose flow rate is robe measured penetrates into the oscillator via the convergent nozzle 3. This nozzle is connected, via a chamber in the form of a cube of side equal to the height of the oscillator, to a duct of circular section (not shown) mounted upstream and through which the fluid flows. On passing through the nozzle 3, the fluid is concentrated to form a jet 30. Above a threshold value for the flow speed of the fluid in the jet 30, said jet alternates at a certain oscillation frequency between the two positions represented by P1 and P2 in FIG. 3.

The natural instability of the jet coming from said oscillation is due to the asymmetry of the jet, which is usually inevitable due to the natural instability of the jet. The asymmetry can be accentuated by placing a small obstacle on the wall of the nozzle 3. However, this is generally not necessary.

The oscillation frequency of the jet between the two positions P1 and P2 is directly proportional to the flow rate of the fluid passing through the oscillator. The factor of proportionality is determined merely by calibrating the oscillator.

When the jet is in position P2 as shown in FIG. 3, two eddies are formed, one of them, 31, is concentrated and strong while the other one of them, 32, is weak. The slots 11 and 12 are positioned so as to correspond to the stop point of the jet, i.e. to the point of impact of the jet on the obstacle 16 at maximum deviation of the jet from the plane of symmetry 2.

In position P2, a portion of the fluid flows through the slot 12 and emerges from the outlet 13 of the slot so as to flow towards the passage 15, thereby increasing the pressure in the passage 5 and at the outlet 17 of the oscillator. The eddy 32 gives rise to fluid escaping towards the outlet 17 via the passages 4 and 14, but also through the slot 11. However, the quantity of fluid flowing through the slot 11 is small compared with the quantity of fluid flowing through the slot 12 while the jet is in position P2.

The jet oscillates between the two positions P1 and P2 for two reasons.

Firstly, it is well known that the trajectory of a free jet is unstable since a jet is never homogeneous in cross-section, but is asymmetrical. When the jet encounters an obstacle, such as the obstacle 16, it oscillates between two extreme positions, with the frequency of oscillation being directly proportional to the flow rate. This oscillation can be explained by the creation of the two main eddies 31 and 32 in FIG. 2.

Secondly, the slots 11 and 12 accentuate the oscillation and increase the frequency of oscillation. For example, in the case shown in FIG. 3, when the jet is in position P2, high pressure zones are established at the inlet to the slot 12 and the presence of a strong eddy 31 practically shuts off the passage 5. Under such circumstances, most of the fluid flows via the passages 4 and 14, with the flow through the slot 11 being relatively small. The fluid that flows through the slot 12 increases the pressure at the outlet thereof and flows away via the passage 15 and also via the passage 5 to encounter the eddy 31. This increase in pressure serves to push the eddy 31 towards the plane of symmetry 2 and thus contributes to displacing the jet from position P2 towards position P1. While the jet is moving in this way, the eddy 31 weakens while the eddy 32 becomes stronger. When the jet reaches the position P1, in a manner symmetrical to that described above with reference to FIG. 3, the eddy 32 is the stronger eddy and the major portion of the fluid flows away via the slot 11 while the portion of the fluid that flows away via the slot 12 is small.

Returning to FIG. 1A, the distance between the outlet 40 of the nozzle 3 and the end wall 41 of the dead zone 9 that faces it constitutes an important geometrical parameter. This distance must be greater than a threshold value. Beyond said value the jet oscillates at a frequency which depends on said distance.

Reducing the depth of the dead zone enables the oscillation frequency to be increased. However it also increases the minimum flow rate for oscillation. A compromise is therefore necessary.

However, if the distance is less than the threshold value, then the fluid jet is not long enough to become unstable and it cannot oscillate.

The distance between the inlets 42 of the slot 11 and 43 of the slot 12 is also important: if this distance is greater than an optimum value, then the oscillation frequency of the jet falls off when the distance 42-43 increases. Conversely, if the distance 42-43 is too short, then the convergent chamber 8 becomes so small that the eddies do not have enough room to move. The two eddies then remain locked in a fixed position and no oscillation of the jet occurs. The dimensions 40-41 and 42-43 depend on the dimensions of the jet itself, and thus on the outlet of the nozzle 3.

To determine the optimum dimensions of the oscillator, it is possible to proceed by digital simulation and by experimentation. For example, to determine the optimum value of the distance 40-41, the obstacle 16 is displaced along the plane of symmetry 2 so as to find said optimum value. Similarly, for the distance 42-43, it is possible to proceed by experiment with different values. The distances 40-41 and 42-43 depend on the outlet dimensions of the nozzle 3.

The purpose of the inlet convergent nozzle 3 is to reduce the flow rate threshold in the fluid to be measured and to make the speed profile thereof more homogeneous.

when the jet moves from position P1 to position P2, the speed of the fluid in the slot 12 is fast while the flow speed of the fluid in the slot 11 is slow. When the jet moves from position P2 to position P1, the opposite situation is established, i.e. the flow speed of the fluid in the slot 11 is faster than the speed in the slot 12.

Consequently, two speed sensors 24 and 25 situated in the slots 11 and 12 can be used to detect the variations in fluid flow speed from one slot to another. Since the speed variations in the slots 11 and 12 are in phase opposition, the output signals from the sensors 24 and 25 may be subtracted so as to obtain a signal having twice the amplitude of the amplitudes provided by the sensors 24 and 25. In addition, by subtracting the signals from the sensors 24 and 25, the signal to noise ratio thereof is improved.

The flow of fluid through the slots 11 and 12 is not subject to disturbances other than the influence of the jet which gives rise to periodic variations in the flow. This flow along the slots is thus easy to monitor. Measuring variations in the fluid flow speed along the slots is an advantageous manner of measuring the oscillation frequency of the jet and consequently the flow rate.

Naturally, as in prior art devices, it is possible to measure the oscillation frequency of the jet by measuring the pressure difference between two specified points in the converging chamber 8. For example, two pressure sensors may be disposed, one of them, 51, close to the inlet 43 of the slot 12, and the other one of them, 50, close to the inlet 42 of the slot 11.

By measuring variations in speed, it is possible to extend the range over which flow rates can be measured. If it is desired to maintain measurement accuracy of the oscillation frequency and thus of the flow rate over a range of 1 to 150, the speed will vary in the same ratio, i.e. from 1 to 150, while the pressure varies from 1 to 150 squared, i.e. from 1 to 2500.

It is very difficult to maintain the same degree of accuracy over such a wide pressure measuring range merely by using a single pressure sensor. In addition, since the amplitude of the pressure signals is, to a first approximation, proportional to the square of the speed of the jet, at low speeds variation in the pressure may be as little as 0.1 Pascals. A pressure of this order of magnitude cannot be detected with pressure sensors. It is therefore advantageous to measure the oscillation frequency of the jet by means of a signal that depends on the speed rather than the pressure of the jet so that the dynamic range of the signal is likewise of the same order of magnitude as the dynamic range of fluid speeds. Any type of speed sensor may be used, for example film sensors or hot wire sensors, thermistors, a silicon sensor, laser anemometers, or even magnetic sensors when the fluid is an electrically conductive liquid.

So as to accelerate the speed of rotation of the eddies and consequently the transfer of dynamic pressure by increasing a pressure in the vicinity of the front portion of the obstacle, it is preferable for the slots 11 and 12 to extend in the direction of the local fluid speed at the points P1 and P2. These points P1 and P2 are situated symmetrically about the point of symmetry 2 and in the immediate proximity of the stop points of the jet on the obstacle 16. These positions depend very little on Reynolds numbers. By adding additional slots (FIG. 7) this dependence can be reduced even further. The respective outputs 10 and 13 of the slots 11 and 12 are situated close to the passages 4 and 5 so as to increase the thrust of the fluid leaving each slot on the larger intensity eddy so as to thrust it back towards the plane of symmetry 2. In FIG. 1A, the slots extend at about 90° relative to the plane of symmetry 2. If this angle of inclination is reduced (i.e. displacing the slot 12 in FIG. 1A so that it points more towards the region 15 than towards the region 5), then the head loss in the oscillator decreases but the frequency of oscillation of the jet also decreases. The direction in which the slots 11 and 12 extend is therefore a result of a compromise.

Figure 2B:
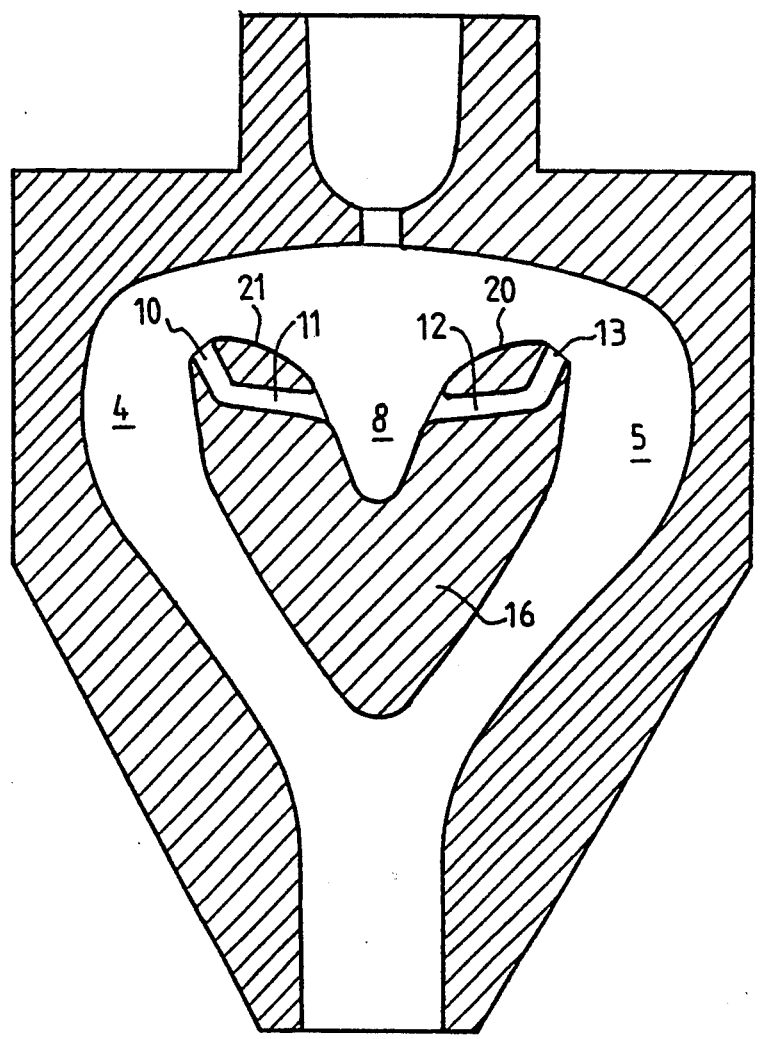
FIG. 2B is a diagram showing a variant embodiment of a fluidic oscillator of the invention.

In order to further improve the thrust generated in alternation on the eddies by the jets leaving the slots 11 and 12, the slots 11 and 12 may be bent as shown in FIG. 2B so as to move the outlets 10 and 13 of the slots 11 and 12 closer to the eddies. Thus, the jets act directly on the eddies without being guided via the channels 4 or 5.

The upper limit on the range of flow rates that can be measured with the oscillator depends only on the head loss to which the fluid is subjected on passing through the oscillator. The lower limit of the measurement range is determined by the flow rate that gives rise to eddies of an intensity that is too small to cause the fluid jet to oscillate. This drawback can be mitigated by placing a speed sensor 44 on the outlet 40 of the converging nozzle 3 for the purpose of measuring very low flow rates that cannot be measured by the oscillator. The range over which the flow meter can measure is thus extended. In addition, the speed sensor 44 may be regularly calibrated by comparison with the speed or flow rate signal provided by the oscillator when the sensor 44 and the oscillator are both operating properly. The speed sensor 44 usually drifts over time whereas the oscillator remains stable. This solution is described in U.S. Pat. No. 5,003,810.

The oscillator of the invention thus uses an oscillating regime based on the hydrodynamic instability that results from interaction between a pair of eddies and a fluid jet. By measuring variations in the speed of the fluid travelling through the slots 11 and 12, it is possible to extend the range of flow rates that can be measured and to obtain better calibration. With the oscillator of the invention, there is no risk of losing the signal in the available measurement range, and the oscillator delivers a single frequency for a given flow rate.

Figure 7:
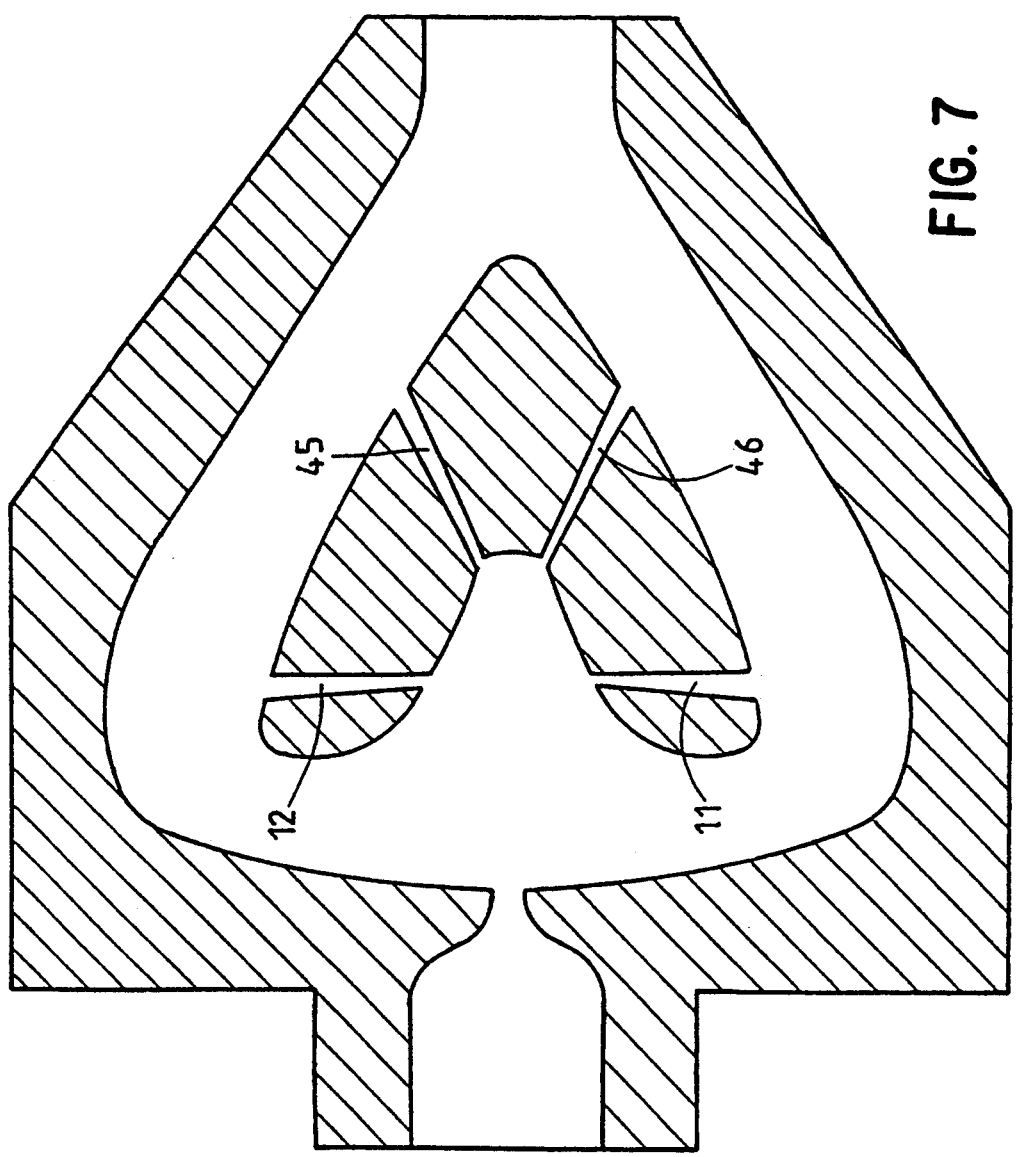
FIG. 7 is a longitudinal section through a second embodiment of the invention.

FIG. 7 shows another embodiment in which two additional slots 45 and 46 are added. This gives rise to greater efficiency of the oscillator by reducing the head loss in the fluid passing through the oscillator. It is thus possible by experiment to find the best compromise between the orientation and the number of slots as a function of the characteristics of the fluid whose flow rate is to be measured, and also as a function of the range of flow rates to be measured.

Figure 4:
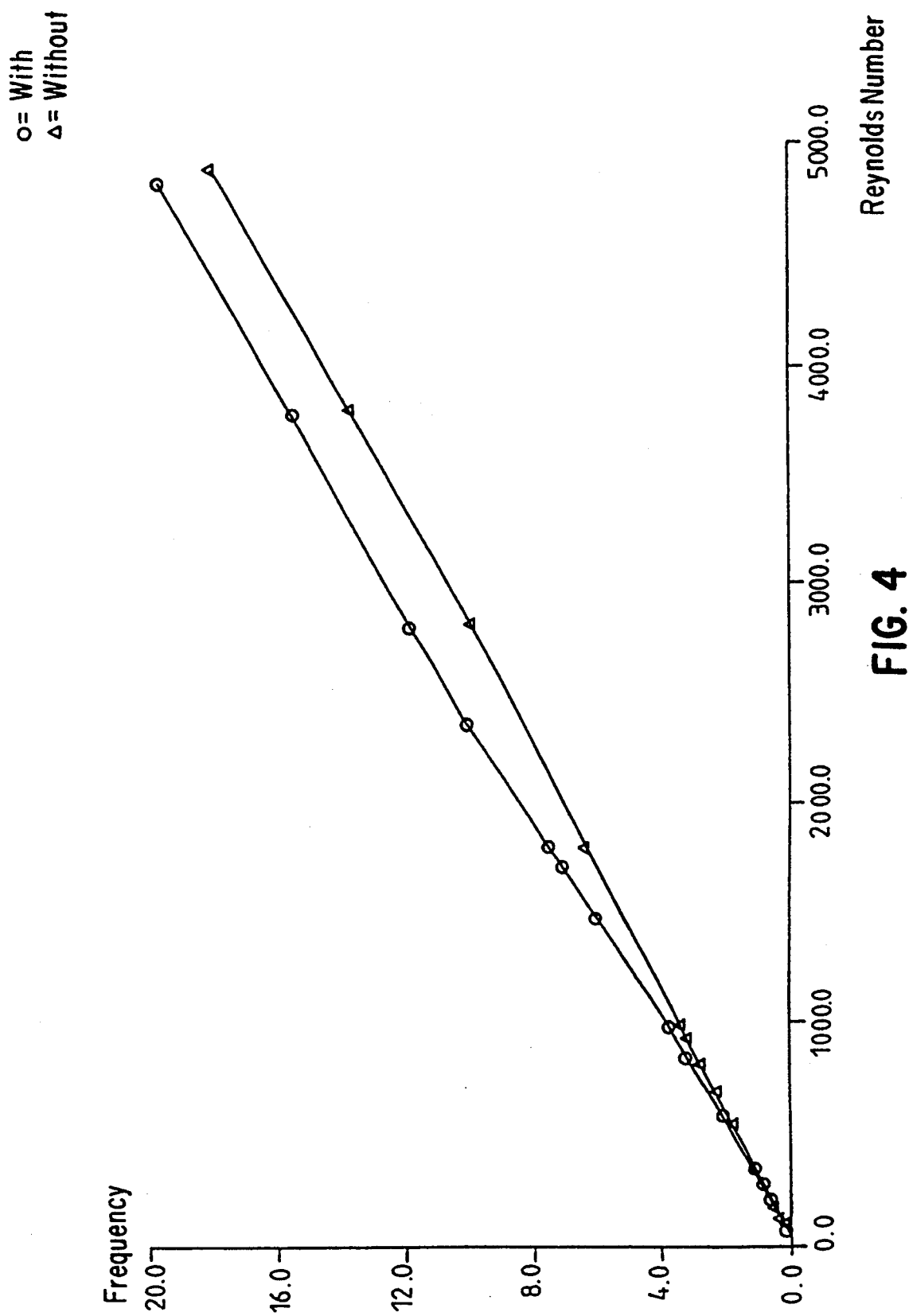
FIG. 4 is a graph showing how the oscillation frequency of the jet varies as a function of the Reynolds number, with and without slots; the Reynolds number is based on the speed of the jet and on the width of the jet.
Figure 5:
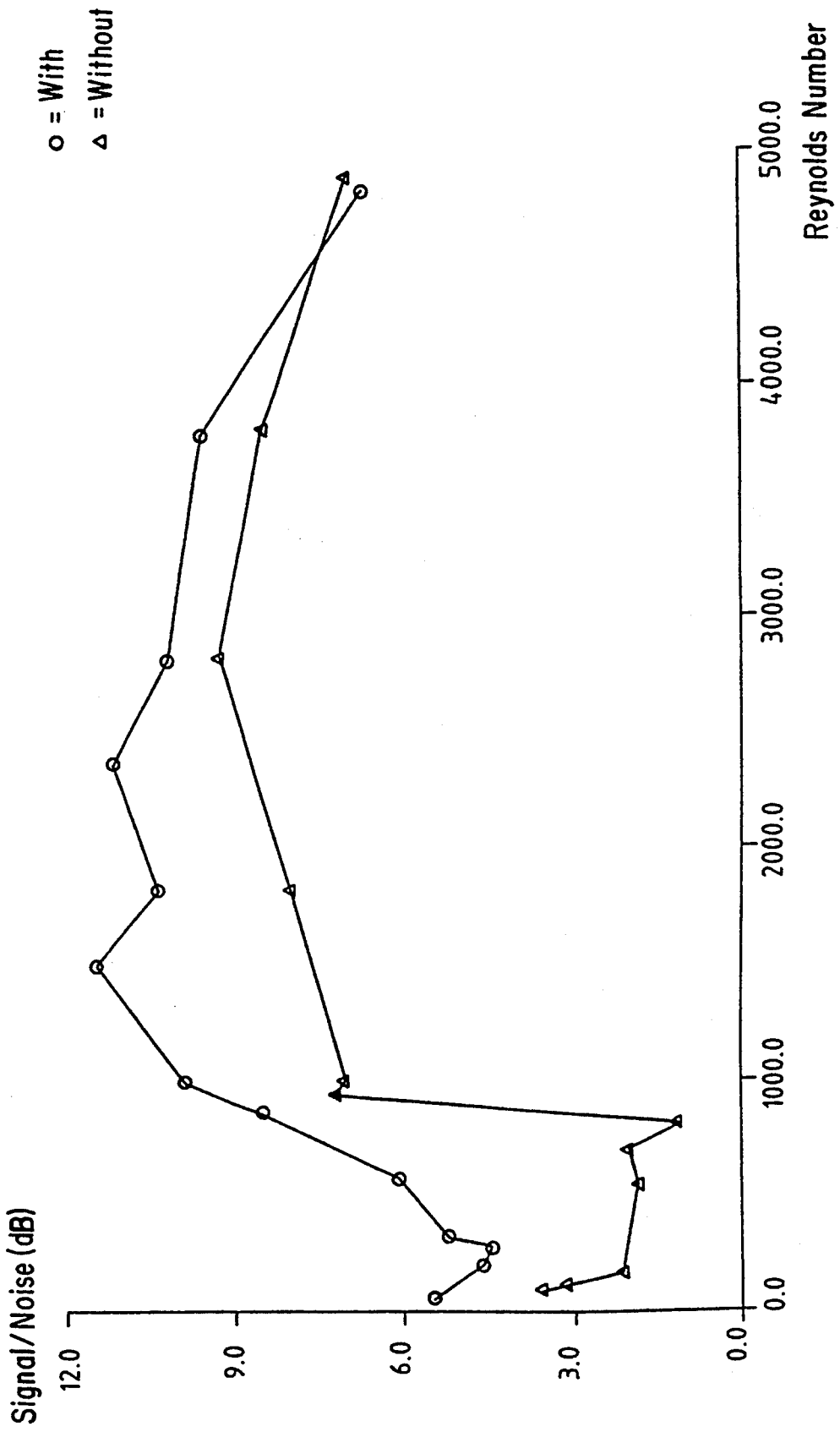
FIG. 5 shows the signal to noise ratio as a function of Reynolds number with and without slots.
Figure 6:
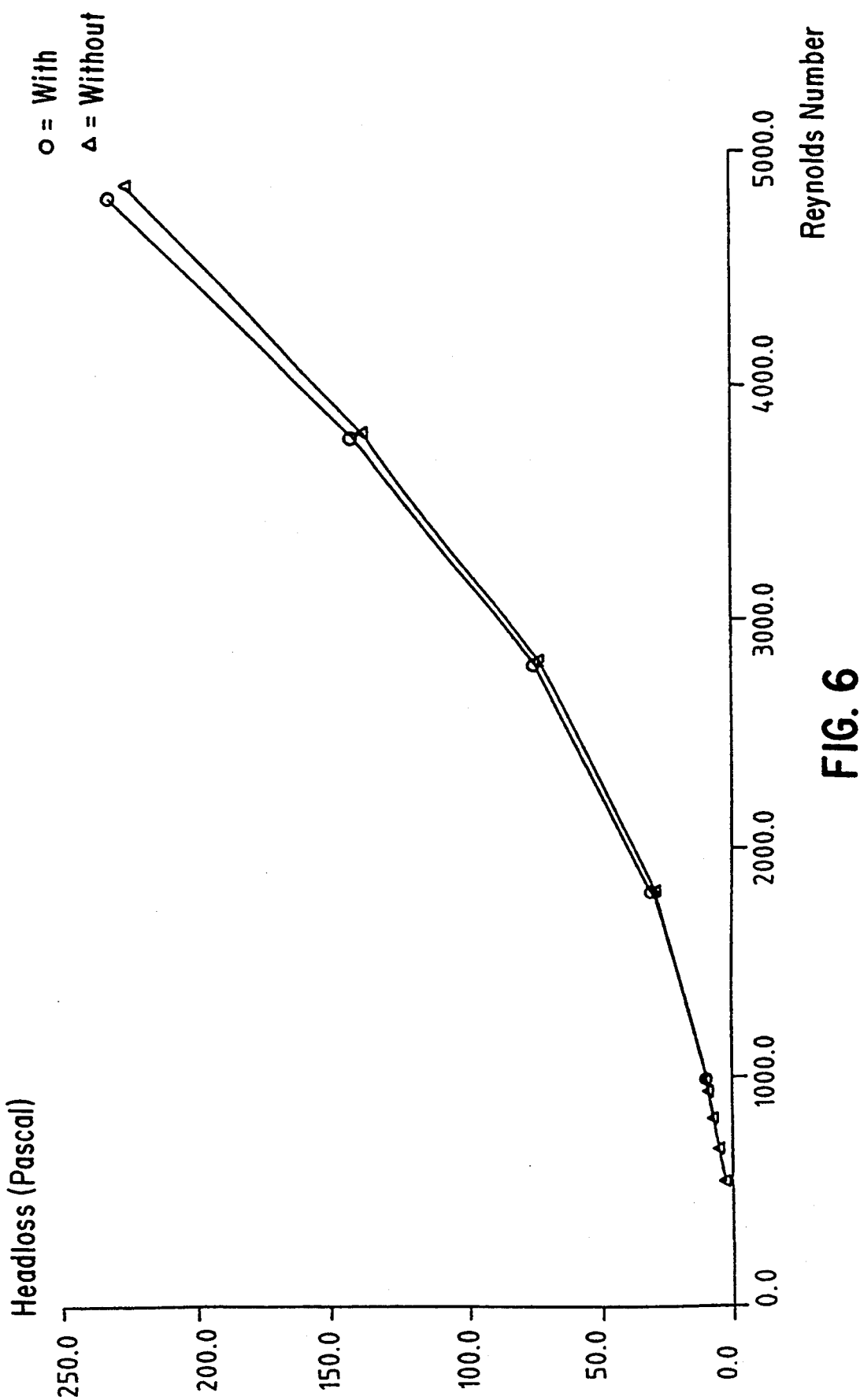
FIG. 6 shows head loss as a function of Reynolds number with and without slots.

FIGS. 4, 5, and 6 are graphs showing experimental results obtained using the fluidic oscillator of FIG. 1A. In order to compare the influence of the slots 11 and 12 on the performance of the oscillator, the experiments were performed by obstructing the slots 11 and 12 in a first series of experiments, while leaving the slots 11 and 12 open during a second series of experiments.

FIG. 4 shows the resulting oscillation frequency expressed in Hertz as a function of the Reynolds number based on the speed of the jet and on its width. The upper curve corresponds to experimental results using slots while the lower curve corresponds to results without slots. It can be seen that the oscillation frequency of the jet is improved with the oscillator of the invention.

FIG. 5 shows how the signal-to-noise ratio, expressed in decibels, varies as the Reynolds number varies. A very considerable improvement in the signal-to-noise ratio can be seen when the slots 11 and 12 are not obstructed (upper curve).

FIG. 6 shows how the head loss expressed in Pascals varies as a function of the Reynolds number with and without slots. It can be seen that the slots 11 and 12 do not give rise to head loss. The experiments whose results are shown in FIGS. 4, 5, and 6 above were performed using air.

I claim:

1. A fluidic oscillator comprising:

a fluid inlet suitable for forming a two-dimensional fluid jet;

an enclosure opening out firstly to said fluid inlet and secondly to a fluid outlet;

a single obstacle being disposed within said enclosure and occupying the major portion of said enclosure, said enclosure having walls cooperating with outside walls of said obstacle to form flow passages for said fluid, said obstacle including a pair of side flanks defining a front portion forming a chamber which both faces said inlet and is located on the path of said jet, said front portion including two walls forming a part of said chamber, said two walls being symmetrical about a longitudinal plane of symmetry passing through said inlet, said walls meeting in said plane: said fluid jet oscillating between two points respectively symmetrically located on each said wall of said chamber, two alternately strong and weak eddies being formed on either side of said longitudinal plane of symmetry in said flow passages; and wherein said oscillator further includes means adapted to alternately accentuate the increase in pressure on each of said side flanks of said obstacle in the vicinity of said front portion in relation to oscillation of said jet between said walls of said chamber.

2. A fluidic oscillator according to claim 1, wherein said walls of said chamber are inclined substantially to form a V-shape whose two branches flare.

3. A fluidic oscillator according to claim 1, wherein said means to alternately accentuate the increase in said pressure includes two main passages disposed symmetrically through said walls of said chamber, each of said main passages being inclined relative to said longitudinal plane and having an inlet inside said chamber and an outlet on one of said side flanks of said obstacle.

4. A fluidic oscillator according to claim 3, wherein said main passages are slots.

5. A fluidic oscillator according to claim 3, wherein said main passages are circular or rectangular or square in section.

6. A fluidic oscillator according to claim 3, wherein said main passages are tapering in section so as to accelerate said fluid flowing through said passages, followed by a flaring section.

7. A fluidic oscillator according to claim 3, wherein said main passages pass through said chamber at or close to a stop point of said jet.

8. A fluidic oscillator according to claim 3, including at least two additional fluid passages formed through said obstacle, said additional passages being downstream from said main passages and being symmetrically disposed relative to said longitudinal plane of symmetry.

9. A fluidic oscillator according to claim 3, wherein at least said main passages are bent.

10. A flow meter, comprising:
(a) a fluidic oscillator, said fluidic oscillatory including:
   (i) a fluid inlet suitable for forming a two-dimensional fluid jet;
   (ii) an obstacle including a front portion forming a chamber facing said inlet and located on the path of said jet, said front portion including two walls forming a part of said chamber, said two walls being symmetrical about a longitudinal plane of symmetry passing through said inlet, said two walls meeting in said plane; two main passages disposed symmetrically through said two walls, each of said main passages being inclined relative to said longitudinal plane and having a passage inlet opening to said chamber and an outlet respectively opening on one of a lateral flank of said obstacle, said fluid jet oscillating between said walls of the chamber at an oscillation frequency that is characteristic of the flow rate of said fluid jet; and
(b) means for measuring said oscillation frequency, wherein said means for measuring said oscillation frequency includes means for measuring variations in the flow speed of said fluid through said main passages formed through said walls of said chamber.

11. A flow meter according to claim 10, wherein said means for measuring variations in the flow speed include a speed sensor placed on at least one of said main passages.

12. A flow meter according to claim 10, wherein the means for measuring the oscillation frequency of said jet include pressure sensors placed in said passages or in the vicinity of said passages.

13. A fluidic oscillator comprising:
a fluid inlet suitable for forming a two-dimensional fluid jet;
a single obstacle including a pair of side flanks defining a front portion forming a chamber which both faces said inlet and is located on the path of said jet, said front portion including two walls forming a part of said chamber, said two walls being symmetrical about a longitudinal plane of symmetry passing through said inlet, said walls meeting in said plane; and wherein said oscillator further includes two main passages disposed symmetrically through said walls of said chamber, each of said main passages being inclined relative to said longitudinal plane and having an inlet inside said chamber and an outlet on one of said side flanks of said obstacle.

14. A fluidic oscillator according to claim 13, wherein the passages are slots.

15. A fluidic oscillator according to claim 13, wherein said passages are circular or rectangular or square in section.

16. A fluidic oscillator according to claim 13, wherein said passages are tapering in section so as to accelerate the fluid flowing through said passages, followed by a flaring section.

17. A fluidic oscillator according to claim 13, wherein said passages pass through said chamber at or close to the stop point of the jet.

18. A fluidic oscillator according to claim 13, including at least two additional fluid passages formed through said obstacle, said additional passages being downstream from the first passages and being symmetrically disposed relative to the longitudinal plane of symmetry.

19. A fluidic oscillator according to claim 13, wherein at least said main passages are bent.

* * * * *